Oct. 25, 1949.  C. H. GIBSON  2,486,273
MAGNETIC WHEELED TOY
Filed Jan. 9, 1946  5 Sheets-Sheet 1
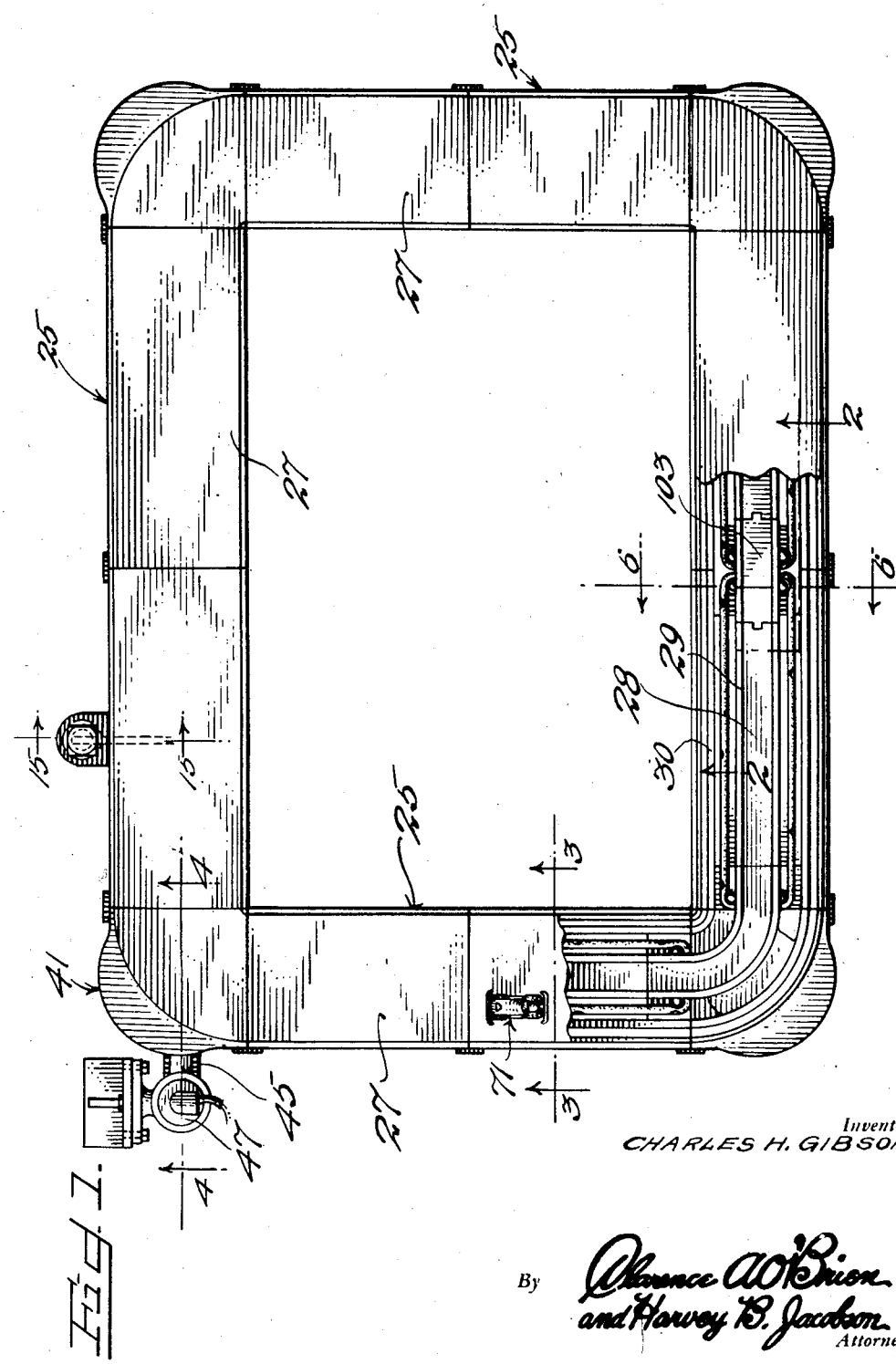
Inventor
CHARLES H. GIBSON,
By *Clarence A. O'Brien and Harvey B. Jackson*
Attorneys Oct. 25, 1949.   C. H. GIBSON   2,486,273
MAGNETIC WHEELED TOY
Filed Jan. 9, 1946   5 Sheets-Sheet 2
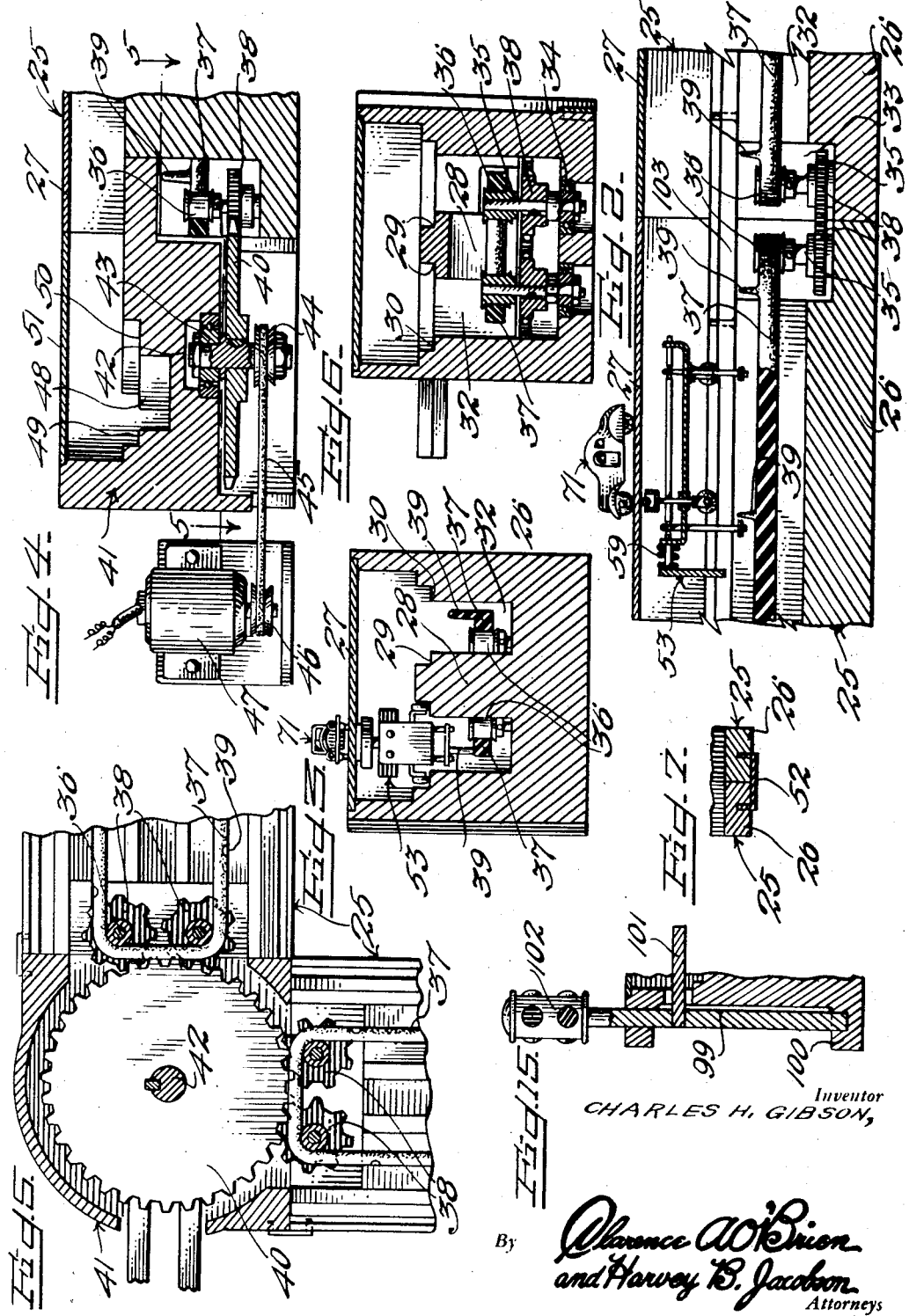
Inventor
CHARLES H. GIBSON,
By Clarence A. O'Brien
and Harvey B. Jacobson
Attorneys Oct. 25, 1949.   C. H. GIBSON   2,486,273
MAGNETIC WHEELED TOY
Filed Jan. 9, 1946   5 Sheets-Sheet 3
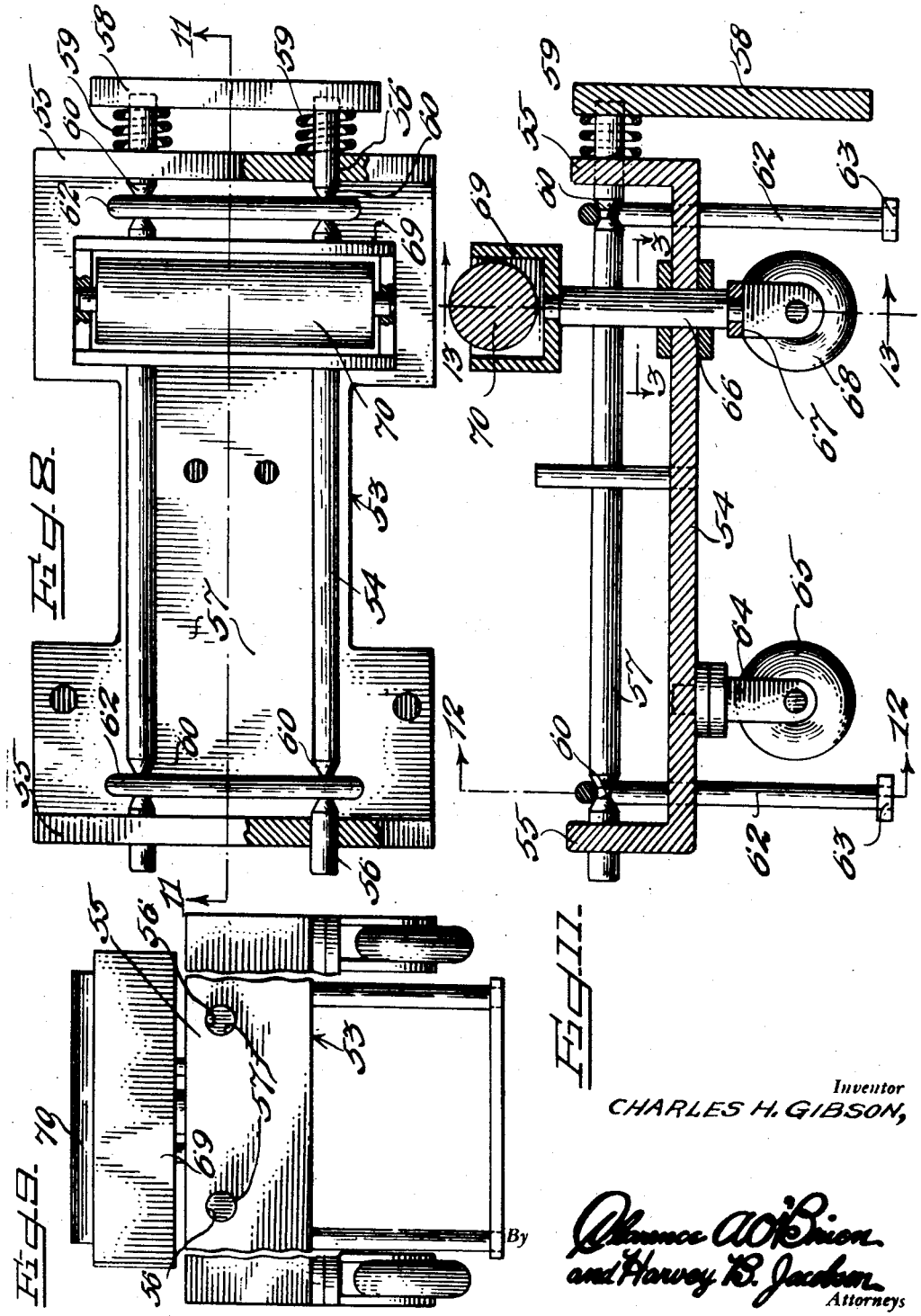
Inventor
CHARLES H. GIBSON,
By
Attorneys Oct. 25, 1949.  C. H. GIBSON  2,486,273
MAGNETIC WHEELED TOY
Filed Jan. 9, 1946  5 Sheets-Sheet 4
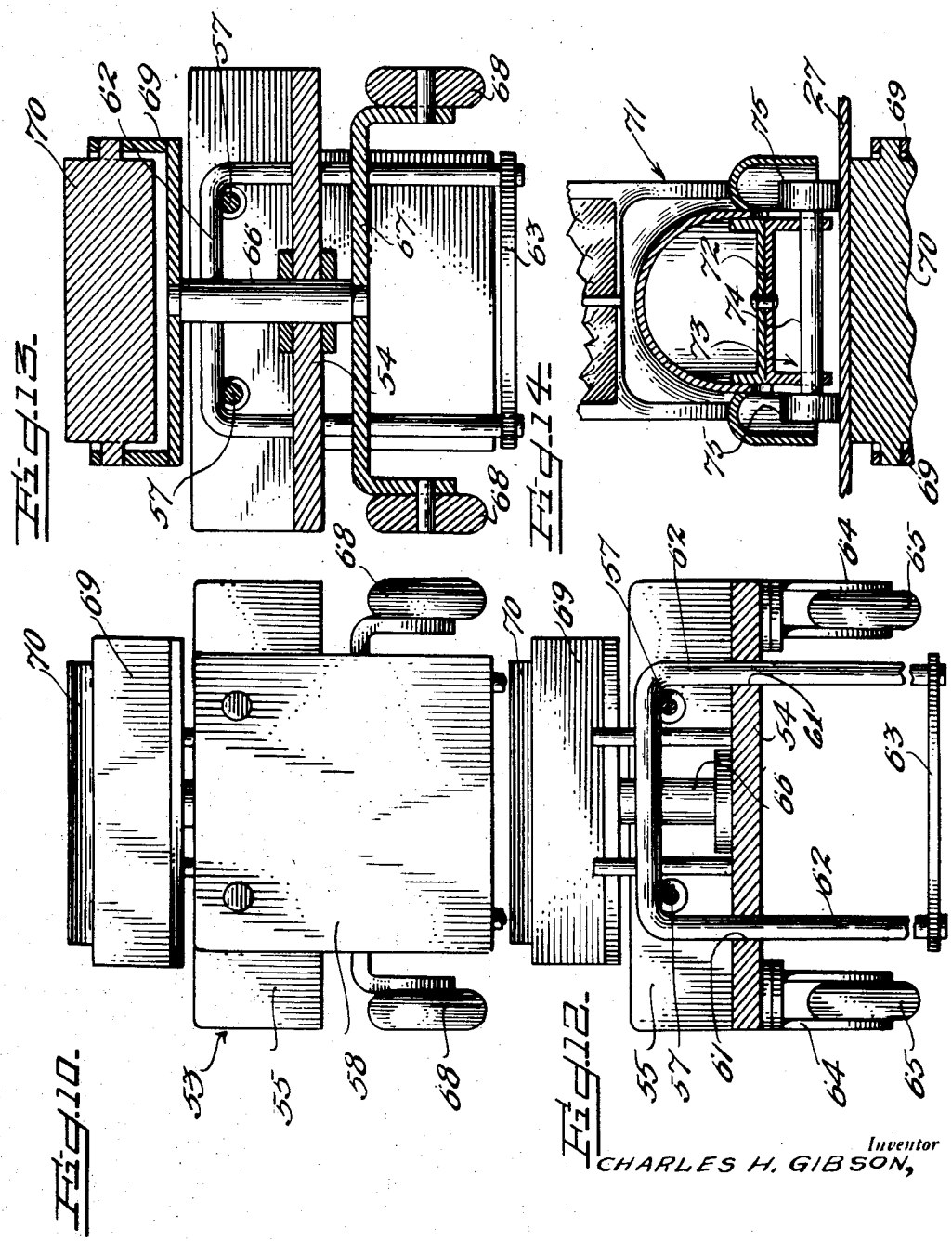
Inventor
CHARLES H. GIBSON,
By
Attorneys

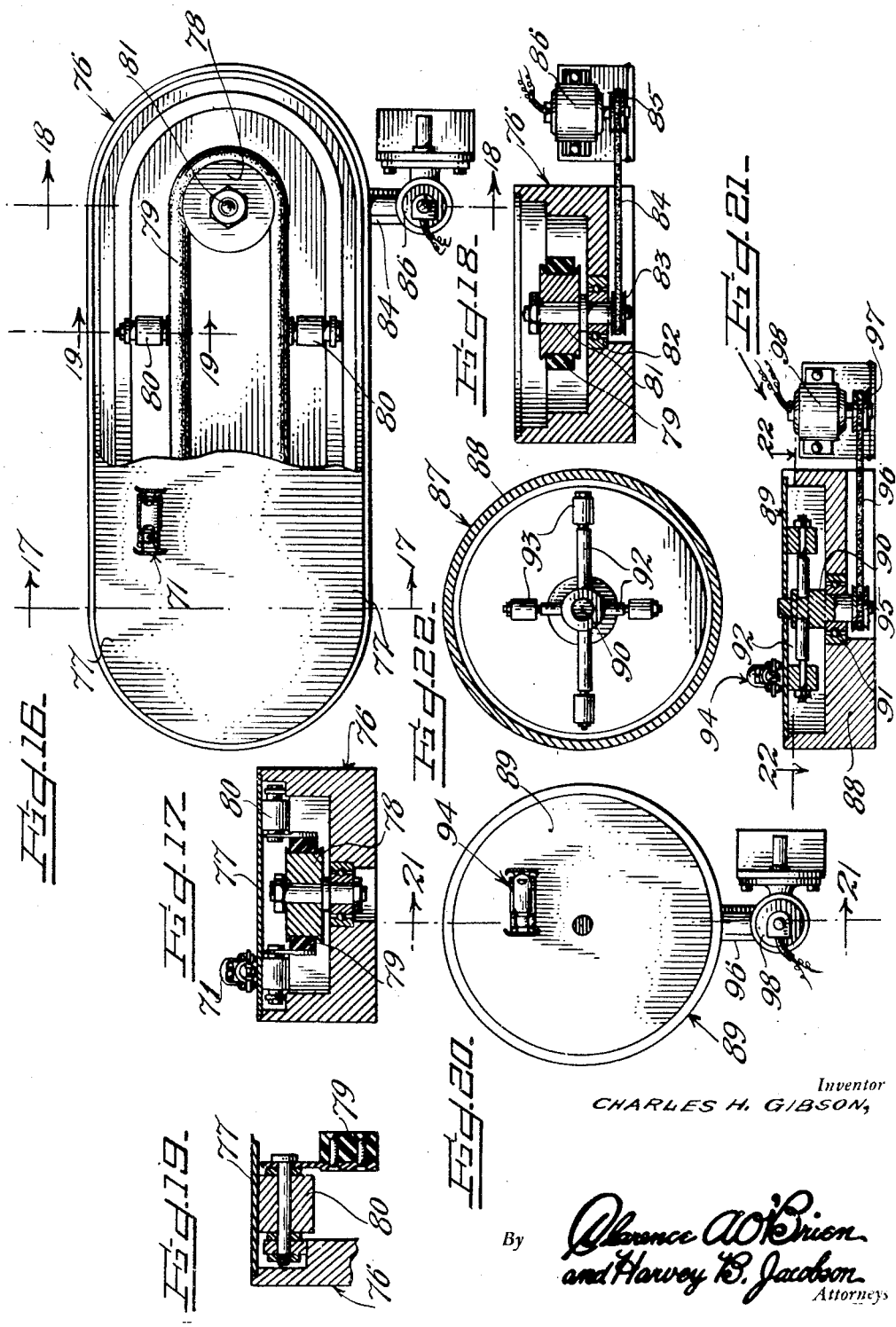

Patented Oct. 25, 1949

2,486,273

UNITED STATES PATENT OFFICE 2,486,273

MAGNETIC WHEELED TOY

Charles H. Gibson, Tyndall Field, Fla.

Application January 9, 1946, Serial No. 640,035

1 Claim. (Cl. 46—45)

1

This invention relates to a toy and more particularly to a toy employing a miniature moving vehicle operating over a roadway or the like.

The primary object of the invention is to afford amusement and entertainment to both children and adults.

A further object is to cause the miniature vehicle to move over the surface in a life-like manner in simulation of vehicles travelling about on the streets or highways.

The above and other objects may be attained by employing this invention which embodies among its features a supporting surface over which a miniature vehicle or a plurality of miniature vehicles are adapted to move, an armature movable beneath the surface in a predetermined path, means to move the armature and a magnet carried by the vehicle adapted to be attracted to the armature whereby the vehicle will move in unison with the armature.

Other features include a carriage movable beneath the surface in a predetermined path, an armature carried by the carriage, means to move the carriage and a magnet carried by the vehicle and adapted to be attracted to the armature whereby the vehicle will move in unison with the carriage.

Still other features include means to arrest the carriage and hold it against movement whereby the motion of the vehicle will be stopped.

Still other features include means to disengage the carriage from its moving means upon its arrest by the arresting means, and means to restore the driving connection between the carriage and the driving means when the arresting means is moved to another position.

In the drawings:

Figure 1 is a top plan view of a toy embodying the features of this invention, portions of the surfaces over which the vehicles travel being broken away to more clearly illustrate the details of construction, Figure 2 is a longitudinal sectional view taken substantially on the line 2—2 of Figure 1, Figure 3 is a transverse sectional view taken substantially on the line 3—3 of Figure 1, Figure 4 is a sectional view taken substantially on the line 4—4 of Figure 1, Figure 5 is a horizontal sectional view taken substantially on the line 5—5 of Figure 4, Figure 6 is a transverse sectional view taken substantially along the line 6—6 of Figure 1, Figure 7 is a fragmentary detail view showing the manner in which the track sections are held together at their joints,

2

Figure 8 is an enlarged plan view of a carriage embodying the features of this invention, Figure 9 is a rear end view of the carriage illustrated in Figure 8, Figure 10 is a front end view of the carriage shown in Figure 8, Figure 11 is a longitudinal sectional view taken substantially along the line 11—11 of Figure 8, Figure 12 is a transverse sectional view taken substantially along the line 12—12 of Figure 11, Figure 13 is a transverse sectional view taken substantially along the line 13—13 of Figure 11, Figure 14 is an enlarged detail view showing the armature and magnet relation when associated with the supporting surface, Figure 15 is an enlarged sectional view taken substantially along the line 15—15 of Figure 1 illustrating in detail the carriage arresting means, Figure 16 is a plan view of a modification of this invention, Figure 17 is a transverse sectional view taken substantially along the line 17—17 of Figure 16, Figure 18 is a transverse sectional view taken substantially along the line 18—18 of Figure 16, Figure 19 is an enlarged fragmentary detail view taken substantially along the line 19—19 of Figure 16, Figure 20 is a top plan view of a further modification of this invention, Figure 21 is a transverse sectional view taken substantially along the line 21—21 of Figure 20, and Figure 22 is a horizontal sectional view taken substantially along the line 22—22 of Figure 21.

Referring to the drawings in detail this improved toy comprises a plurality of track or bed sections each designated generally 25 which are joined together at their ends to form a continuous track over which the miniature vehicles operate.

Each track section 25 comprises a substantially transversely U-shaped base member 26 between the upper ends of the legs of which is supported a supporting surface 27 which is preferably formed of a non-magnetic material and is relatively thin in cross-section. Formed intermediate the legs of the U-shaped base member 26 and projecting upwardly therefrom to a point intermediate the upper ends of the legs is a longitudinally extending central rib 28 formed on opposite sides with shoulders 29 which cooperate with similar shoulders 30 formed on the inner faces of the legs of the U-shaped body 26 in forming tracks along which the vehicle moving carriages to be more fully hereinafter described run. From the foregoing description it will be seen that troughs 32 extend longitudinally of the U-shaped base member 26 to house the carriage driving elements as will be more fully hereinafter explained. The longitudinally extending ribs 28 terminate somewhat short of the ends of the track sections 25 to form chambers 33 adjacent opposite ends thereof for the reception of the drive pulleys about which the carriage driving belts operate.

Mounted on suitable anti-friction bearings 34 in the bight portion of the U-shaped body 26 adjacent opposite ends, are pairs of vertically extending shafts 35 carrying adjacent their upper ends pulleys 36 over which drive belts 37 are trained so that when the pulleys are rotated the drive belts will move through the troughs 32 previously referred to. Mounted on each shaft 35 between the anti-friction bearing 34 and its respective pulley 36 is a drive pinion 38. Spaced lugs 39 project upwardly from each drive belt 37 as will be readily understood upon reference to Figures 2 and 3.

As illustrated in Figure 5 the drive pinions 38 project slightly beyond the ends of their respective track sections 25 for meshing engagement with a drive gear 40 carried by an end connecting section designated generally 41. This drive gear is mounted on a drive shaft 42 which is mounted for vertical rotation in an anti-friction bearing 43 carried by the end unit 41 and mounted on the drive shaft 42 adjacent the drive gear 40 is a pulley 44 around which a belt 45 is trained. This belt has driving connection with the drive pulley 46 of a prime mover 47 such as a miniature electric motor so that when the motor is set into operation the gear 40 will drive the pinions 38 and consequently drive the belt 37 to cause the upstanding lugs 39 carried thereby to move longitudinally through their respective troughs 32. A portion of the body of the end section 41 is provided with spaced arcuate grooves 48 the opposite side walls of which are provided with shoulders 49 and 50 which when the parts are assembled register with the shoulders 29 and 30 respectively in order to guide the carriage previously mentioned around a corner. Like the sections 25 the end section or corner section 41 is provided with a supporting surface 51 which lies in a plane with the supporting surface 27 of the adjacent track sections 25 as will readily be understood upon reference to Figure 4. The abutting ends of the track sections are joined together by a suitable staple 52 (Figure 7) and when in such position the supporting surfaces 27 of adjacent track sections 25 will lie in abutting relation and in the same plane as illustrated in Figure 2.

Mounted for movement longitudinally of the track sections beneath their respective supporting surfaces 27 is a carriage or a plurality of carriages designated generally 53. Each such carriage comprises a bed plate 54 opposite ends of which are upturned as at 55 and are provided with aligning openings 56 for the reception of longitudinally sliding bars 57. The forward ends of these bars 57 are joined by a transversely extending buffer plate 58 and surrounding each bar 57 between the forward upturned end of the bed plate 54 and the buffer plate 58 is a compression coil spring 59 which normally tends to urge the buffer plate and bars forwardly. Formed in the bars 57 near opposite ends are annular grooves 60 the side walls of which are bevelled as illustrated in Figures 8 and 11 to form guiding surfaces for the latch members to be more fully hereinafter explained. Formed in the bed plate 54 near opposite ends are spaced openings 61 forming guides for inverted U-shaped yokes 62 the bight portion of each of which engages the bars 57 so that when the buffer plate 58 is in its forward position as illustrated in Figures 8 and 11 the bight portions of the yokes 62 will rest in the grooves 60, but when the buffer plate is moved backwardly relative to the bed plate 54 the yokes 62 will be elevated so as to rest on the bars 57 adjacent the grooves 60. Connecting the lower ends of the legs of the yokes 62 are transversely extending bars 63 which when the yokes are in their lowermost position are adapted to be engaged by the lugs 39 of the belts 37 so as to cause the carriage to move in unison with the belts. (See Figure 2.) On the other hand when the bars are moved longitudinally so as to lift the yokes 62 the bars 63 will be elevated a distance sufficient to permit the lugs 39 to move freely thereunder. Carried by the bed plates 54 are depending brackets 64 the lower ends of which support rear guide wheels 65 which are adapted to ride on the shoulders 29 and 30 when the carriage is moving along one of the track members 25, or to ride along the shoulders 49 and 50 when the carriage is moving around a corner. Pivotally supported near the forward end of the bed plate 54 is a vertical shaft 66 carrying a transversely extending yoke 67 to opposite ends of which are rotatably connected rollers or wheels 68 which like the wheels 65 are adapted to travel on the shoulders 29 and 30, or 49 and 50. As will be understood from the drawings the yoke 67 is rotatable with the vertical shaft 66 to facilitate turning movement of the carriage when following the tracks formed by the shoulders. Mounted in a suitable trough 69 at the upper end of the shaft 66 is a roller 70 which is preferably of soft iron or a suitable highly magnetic alloy which forms an armature for a permanent magnet to be more fully hereinafter explained.

As illustrated in Figures 2, 3 and 14 the armature 70 has rolling contact with the underside of the supporting surfaces 27 or 51 as the case may be and mounted for movement on the upper side of the supporting surfaces is a miniature vehicle designated generally 71. This vehicle is provided with rear wheels of any suitable construction while the front end of the vehicle is supported on a swivelly mounted yoke 72 in which is journaled a permanent magnet designated generally 73 which includes an axle shaft 74 carrying at opposite ends solid discs 75 forming the front wheels of the vehicle. The magnet 73 is to be of sufficient power to be attracted to the armature 70 so that as the carriage 53 moves beneath the surface or surfaces 27 the vehicle 71 will move in unison therewith.

In the modification illustrated in Figures 16 to 19 inclusive a single bed designated generally 76 is employed on which a supporting surface 77 is carried. A pulley 78 is mounted adjacent opposite ends of the bed 76 and trained about said pulleys is a belt 79 carrying armatures 80 which correspond in all respects to the armatures 70 previously described. One of the pulleys 78 is an idler while the opposite pulley 78 is connected to a drive shaft 81 mounted in a suitable anti-friction bearing 82 in the bottom of the bed 76 and carried by the drive shaft 81 is a drive pulley 83 over which a belt 84 is trained. This belt has driving connection with the drive pulley 85 of a suitable prime mover 86. As illustrated in Figure 19 the armatures 80 have rolling contact with the under side of the supporting surface 77 and a miniature vehicle 71 corresponding in all respects to the vehicle 71 previously described is mounted to move over the surface 77 in unison with the armatures 80.

In a still simpler form of the device a circular unit designated generally 87 comprising a substantially dish-shaped body 88 is provided and this body carries a supporting surface 89 beneath which a shaft 90 is rotatably mounted in suitable anti-friction bearings 91 and carries radiating arms 92 the outer ends of which are provided with armatures 93 in the form of rollers which engage the underside of the supporting surface 89 and serve to move miniature vehicles 94 corresponding in all respects to the vehicle 71 when the shaft 90 is rotated. A drive pulley 95 is attached to the shaft 90 adjacent its lower end and trained over the pulley 95 is a drive belt 96 having driving connection with the drive pulley 97 of a prime mover 98 such as a miniature electric motor.

In the foregoing it will be seen that a toy has been provided in which the motive power is concealed beneath a supporting surface over which miniature vehicles are caused to move in unison with moving armatures to which permanent magnets carried by the toys are adapted to be attracted. When it is desired to arrest motion of any of the toys a shaft 99 mounted for rotation in suitable bearing brackets 100 carried by one of the track units 25 is rotated to move a stop arm 101 carried by the shaft into the path of a moving carriage 53 so as to engage the buffer plate 58 thereof and cause a longitudinal shifting movement of the bars 57 so as to elevate the latch members 62 and move the bars 63 carried thereby out of the path of the lugs 39. Not only does the stop arm 101 act to stop movement of the carriage but it also trips the disengaging mechanism so that the belts 37 may move harmlessly beneath the carriage without transmitting motion thereto. As soon as pressure is released by returning the stop arm to disengaging position the springs 59 restore the rods 57 to their forward position and permit the latch members to again be engaged by the lugs 39. The upper end of the shaft 99 may be provided with a suitable head 102 simulating a signal tower. In order to carry the carriages 53 from one unit 25 to another suitable bridge pieces 103 are arranged to be inserted between adjacent ends of the units 25 as will be readily understood upon reference to Figures 1 and 2. The carriages are of sufficient length and the distance between the latch members is such that in moving from one track section to another or in travelling around curves the latch members will be engaged by the lugs on the belts of the adjacent track section 25.

While in the foregoing there has been shown and described the preferred embodiment of this invention it is to be understood that minor changes in the details of construction, combination and arrangement of parts may be resorted to without departing from the spirit and scope of the invention as claimed.

I claim:

In a toy a non-magnetic supporting surface, a miniature vehicle movable over the surface, said vehicle having a pair of front wheels and a pair of rear wheels having rolling contact with the surface, an armature having rolling contact with the underside of the surface, means beneath the surface to move the armature and one pair of the wheels of said vehicle comprising opposite poles of a permanent magnet which is attracted to the armature whereby the vehicle will move in unison with the armature.

CHARLES H. GIBSON.

REFERENCES CITED

The following references are of record in the file of this patent:

UNITED STATES PATENTS

| Number | Name | Date |
|---|---|---|
| 588,988 | Harrington | Aug. 31, 1897 |
| 1,171,972 | Myers | Feb. 15, 1916 |
| 2,036,076 | Philippi | Mar. 31, 1936 |
| 2,157,889 | Decker | May 9, 1939 |
| 2,239,395 | Mallory | Apr. 22, 1941 |
| 2,254,153 | Larrabee | Aug. 26, 1941 |
| 2,254,967 | Larkins | Sept. 2, 1941 |

FOREIGN PATENTS

| Number | Country | Date |
|---|---|---|
| 137,708 | Austria | Jan. 15, 1934 |
| 9,537 | Great Britain | 1911 |
| 15,493 | Great Britain | 1893 |